US006739198B2

(12) United States Patent
Suzuki et al.

(10) Patent No.: US 6,739,198 B2
(45) Date of Patent: May 25, 2004

(54) PRESSURE SENSITIVE SENSOR

(75) Inventors: Shigeru Suzuki, Yokkaichi (JP); Mohachi Mizuguchi, Yokkaichi (JP); Yoshinao Kobayashi, Yokkaichi (JP); Hiroshi Inoue, Yokkaichi (JP)

(73) Assignee: Sumitomo Wiring Systems, Ltd., Yokkaichi (JP)

( * ) Notice: Subject to any disclaimer, the term of this patent is extended or adjusted under 35 U.S.C. 154(b) by 0 days.

(21) Appl. No.: 10/025,630

(22) Filed: Dec. 26, 2001

(65) Prior Publication Data

US 2002/0078758 A1 Jun. 27, 2002

(30) Foreign Application Priority Data

Dec. 27, 2000 (JP) ....................................... 2000-397945

(51) Int. Cl.[7] .................................................. G01L 9/00

(52) U.S. Cl. ....................... 73/753; 73/726; 73/862.629; 29/407.08

(58) Field of Search .......................... 73/726, 753, 720, 73/718, 724, 727, 754, 862.629; 200/61.43; 264/40.1; 29/407.08

(56) References Cited

U.S. PATENT DOCUMENTS 5,114,636 A * 5/1992 Evangelista et al. ........ 264/230
5,311,779 A * 5/1994 Teruo ............................ 338/4
6,166,338 A * 12/2000 Ebato ...................... 166/105.5
6,183,685 B1 * 2/2001 Cowman et al. ............ 264/617
6,349,461 B2 * 2/2002 Ishihara et al. .......... 29/407.08

FOREIGN PATENT DOCUMENTS

JP 10281906 10/1998
JP 2001174340 6/2001
JP 2001174348 6/2001

OTHER PUBLICATIONS

English Language Abstract of JP 10–281906.
English Language Abstract of JP 2001–174340.
English Language Abstract of JP 2001–174348.

* cited by examiner

*Primary Examiner*—Edward Lefkowitz
*Assistant Examiner*—Alandra Ellington
(74) *Attorney, Agent, or Firm*—Greenblum & Bernstein, P.L.C.

(57) ABSTRACT

A pressure sensitive sensor is provided that includes a net braid member formed by knitting a plurality of insulating yarn strands, such as an aramid fiber, interposed between an elastic electroconductive tube and a central electrode member. The elastic electroconductive tube and the central electrode member are brought into electrical contact with each other through the gap portion of the mesh of the net braid member at a pressure point, and pressure is detected. The central electrode member is formed by winding an electroconductive metal wire in a coil on the outer peripheral surface of a central member formed by coating an elastic insulating material on a central reinforcing member formed of an aramid fiber. Thus, a pressure sensitive sensor which has a simple construction, can be produced easily and at low cost, is suitable for making a small sensor, and can appropriately function even if the sensor is warped or kinked at a sharp curvature.

19 Claims, 3 Drawing Sheets

PRESSURE SENSITIVE SENSOR

BACKGROUND OF THE INVENTION

1. Field of the Invention

The present invention relates to a pressure sensitive sensor.

2. Description of Background Information

A conventional pressure sensitive sensor, such as the sensor described in Japanese Patent Publication (Kokai) Hei No. 10-281906, is shown in FIG. 8. The conventional pressure sensitive sensor includes a cavity 1*a* that extends along the inside of a long narrow elastic insulator 1 in a longitudinal direction, and a plurality of electrode wires 3A to 3D are buried in the thickness of the elastic insulator 1 at intervals along the periphery in a circumferential direction. The plurality of electrode wires 3A to 3D are spirally twisted around the cavity 1*a*, and one section of a peripheral surface of each electrode wire 3A to 3D is exposed in the cavity 1*a*. Further, when the elastic insulator 1 is elastically deformed, as when the cavity 1*a* is crushed by pressing, the electrode wires 3A to 3D are brought into conducting contact with each other, therefore external pressure can be detected.

A method of producing the pressure sensitive sensor includes preparing a twisted wire by twisting a spacer, which is of the same shape as the cavity 1*a*, with a plurality of electrode wires 3A to 3D, and pulling the spacer out after coating the twisted wire with the elastic insulator 1.

However, in the case of the conventional pressure sensitive sensor, complicated production steps of twisting the spacer with the electrode wires 3A to 3D and pulling out the spacer afterward are required to form the structure, and there is a problem of high cost.

Further, the cross-section of the sensor is large in size because of the necessity of forming the cavity 1*a* in a central location, and the necessity of burying the electrode wires 3A to 3D in the thickness of the elastic insulator 1. For these and other reasons, it is not suitable to make the sensor in a small size.

Further, since there is no procedure for positively separating each of the electrode wires 3A to 3D to insulate them, there is also a danger that when the pressure sensitive sensor is arranged in a warped or kinked section of the insulator, the electrode wires 3A to 3D will be brought in contact with each other by mistake to cause an error in detection.

SUMMARY OF THE INVENTION

Accordingly, considering the above-mentioned problems, it is an object of the present invention to provide a pressure sensitive sensor with a simple structure that can be produced easily and at low cost.

Further, another object of the present invention is to provide a pressure sensitive sensor that is appropriate for production with a small cross-sectional area and that can appropriately function even if it is arranged in a warped section with a sharp curvature.

According to an aspect of the present invention, the technical procedure for attaining the above-mentioned objects is to provide a pressure sensitive sensor for detecting pressure by electrical conduction caused by mutual contact by pressing the first and the second electrode members, which are positioned separated from each other, wherein a net braid member that includes an insulating material allows the electrical contact between the first electrode member and the second electrode member through the gap portion of its mesh at the pressure location, and then separates to insulate the first electrode member and the second electrode member when no pressure is provided between the first electrode member and the second electrode member. Preferably, the net braid member is formed by knitting a plurality of yarn materials which are formed of an insulating fiber, and the yarn materials are bundled by coating an insulating resin or rubber on its surface or being impregnated with the insulating resin.

According to a further aspect of the present invention, the first electrode member is an elastic electroconductive tube that includes an elastic electroconductive material, the second electrode member has a long narrow shape that can be bent and extends longitudinally in one direction and a central electrode member which is provided in the elastic electroconductive tube, and the net braid member is provided between the central electrode member and the elastic electroconductive tube so that it covers the outer peripheral surface of the central electrode member.

Further, preferably, the central electrode member has the property that it can recover its shape against a fixed tensile strength and bending deformation, and is provided with a long, narrow central member at least whose outer peripheral portion has elasticity, and an electroconductive metal wire horizontally wound around the outer peripheral portion of the central member in a coil form.

In another aspect of the present invention, the central electrode member is further provided with an electroconductive coating layer including an electroconductive resin or an electroconductive rubber that is provided on the inside of the net braid member so that the outer peripheral surface of the central member is covered outside of the metal wire.

In a further aspect of the present invention, the elastic electroconductive tube is formed by extrusion molding the elastic electroconductive material on the outer peripheral surface of the central electrode member on the outside of the net braid member.

Moreover, preferably, the central electrode member is formed by twisting or bundling a plurality of single metal wires.

Further, the central electrode member may include a single metal wire.

According to an aspect of the present invention, a pressure sensitive sensor for detecting pressure by electrical conduction caused by pressing into contact with each other a first electrode member and a second electrode member provided in a spaced arrangement in an unpressed state is provided including an insulative member provided between the first electrode member and the second electrode member, the insulative member including an insulating material that allows electrical contact between the first electrode member and the second electrode member when pressed and insulates the first electrode member and the second electrode when not pressed. The insulative member may include a net braid member provided between the first electrode member and the second electrode member, the net braid member allowing electrical contact between the first electrode member and the second electrode member through a gap portion in its mesh when pressed, and insulating the first electrode member and the second electrode when not pressed. The net braid member may further be formed by knitting a plurality of yarn strands. The yarn strands may further include an insulating fiber coated on its surface with an insulating resin or rubber, or an insulating fiber impregnated with an insulating resin or rubber.

According to a further aspect of the present invention, the first electrode member may include an elastic electroconductive tube including an elastic electroconductive material, the second electrode member may include a central electrode member having a long narrow bendable shape provided inside the elastic electroconductive tube, and the insulative member may be provided between the central electrode member and the elastic electroconductive tube so that the insulative member covers an outer peripheral surface of the central electrode member. The central electrode member may be restorable to its shape from tensile and bending deformation, and the central electrode member may be provided with a central member having a long narrow shape and having at least an outer elastic peripheral portion and an electroconductive metal wire wound on the outer periphery of the central member in a coil.

In a further aspect of the present invention, the central electrode member may be provided with an electroconductive coating layer including an electroconductive resin or an electroconductive rubber provided on the inside of the insulative member so that an outer peripheral surface of the central member is covered underneath the metal wire. The elastic electroconductive tube may be formed by extrusion molding the elastic electroconductive material on an outer peripheral surface of the central electrode member and covering the insulative member. Further, the central member may be constructed by twisting or bundling a plurality of single metal wires, or may include a single metal wire.

In another aspect of the present invention, the electroconductive metal wire wound on the outer periphery of the central member in a coil may be wound tightly around the central member and embedded into the outer periphery of the central member. The electroconductive metal wire may be embedded in the outer periphery of the central member to substantially half the diameter of the electroconductive metal wire.

According to a further aspect of the present invention, the first electrode member may include a first plate including an elastic electroconductive material, the second electrode member may include a second plate including an elastic electroconductive material, and the insulative member may be provided between the first plate and the second plate. The first and second electrode members may be restorable to their shapes from tensile and bending deformation.

According to another aspect of the present invention a method of making a pressure sensitive sensor for detecting pressure by electrical conduction caused by pressing into contact with each other a first electrode member and a second electrode member provided in a spaced arrangement in an unpressed state is provided including providing an insulative member between the first electrode member and the second electrode member, the insulative member including an insulating material that allows electrical contact between the first electrode member and the second electrode member when pressed and insulates the first electrode member and the second electrode when not pressed. The insulative member may include a net braid member provided between the first electrode member and the second electrode member, the net braid member allowing electrical contact between the first electrode member and the second electrode member through a gap portion in its mesh when pressed, and insulating the first electrode member and the second electrode when not pressed. Further, the net braid member may be formed by knitting a plurality of yarn strands; and the yarn strands may include an insulating fiber coated on its surface with an insulating resin or rubber or the yarn strands may include an insulating fiber impregnated with an insulating resin or rubber.

In a further aspect of the present invention, the method may further include providing a first electrode member including an elastic electroconductive tube including an elastic electroconductive material, providing a second electrode member including a central electrode member having a long narrow bendable shape provided inside the elastic electroconductive tube, and providing the insulative member between the central electrode member and the elastic electroconductive tube so that the insulative member covers an outer peripheral surface of the central electrode member. The method may further include providing the central electrode member with a central member having a long narrow shape and having at least an outer elastic peripheral portion and an electroconductive metal wire wound on the outer periphery of the central member in a coil. Further, the method may include providing the central electrode member with an electroconductive coating layer including an electroconductive rubber provided on the inside of the insulative member so that an outer peripheral surface of the central member is covered underneath the metal wire.

According to a further aspect of the present invention, the method may further include forming the elastic electroconductive tube by extrusion molding the elastic electroconductive material on an outer peripheral surface of the central electrode member and covering the insulative member. The method of making a pressure sensitive sensor may include constructing the central member by twisting or bundling a plurality of single metal wires. Further, winding the electroconductive metal wire on the outer periphery of the central member in a coil may include winding the electroconductive wire tightly around the central member and embedding the electroconductive metal wire into the outer periphery of the central member. Winding the electroconductive metal wire tightly around the central member and embedding the electroconductive metal wire in the outer periphery of the central member may include embedding the electroconductive metal wire to substantially half the diameter of the electroconductive metal wire.

In another aspect of the present invention, the method of making a pressure sensitive sensor may include providing a first electrode member including a first plate including an elastic electroconductive material, providing a second electrode member including a second plate including an elastic electroconductive material, and providing the insulative member between the first plate and the second plate.

In a further aspect of the present invention, a method of using a pressure sensitive sensor for detecting pressure by electrical conduction caused by pressing into contact with each other a first electrode member and a second electrode member provided in a spaced arrangement in an unpressed state is provided including providing a pressure sensitive sensor including a first electrode member, a second electrode member, and an insulative member between the first electrode member and the second electrode member, the insulative member including an insulating material that allows electrical contact between the first electrode member and the second electrode member when pressed, and insulates the first electrode member and the second electrode member when not pressed, and pressing on the pressure sensitive sensor and the insulative member therewith, thus allowing electrical contact between the first electrode member and the second electrode member. The method may further include providing a net braid member between the first electrode member and the second electrode member, the net braid member allowing electrical contact between the first electrode member and the second electrode member through a gap portion in its mesh when pressed, and pressing on the net braid member thus allowing electrical contact between the first electrode member and the second electrode member through the gap portion of the net braid member. In a further aspect of the present invention, a combination is provided including an automobile body, a door, and a pressure sensitive sensor. In a further aspect of the present invention, a combination is provided including an automobile body, a seat, and a pressure sensitive sensor.

BRIEF DESCRIPTION OF THE DRAWINGS

The above and other objects, features and advantages of the present invention will be made apparent from the following description of the preferred embodiments, given as non-limiting examples, with reference to the accompanying drawings in which.

DETAILED DESCRIPTION OF THE PREFERRED EMBODIMENTS

The particulars shown herein are by way of example and for purposes of illustrative discussion of the embodiments of the present invention only and are presented in the cause of providing what is believed to be the most useful and readily understood description of the principles and conceptual aspects of the present invention. In this regard, no attempt is made to show structural details of the present invention in more detail than is necessary for the fundamental understanding of the present invention, the description is taken with the drawings making apparent to those skilled in the art how the forms of the present invention may be embodied in practice.

Figure 1:
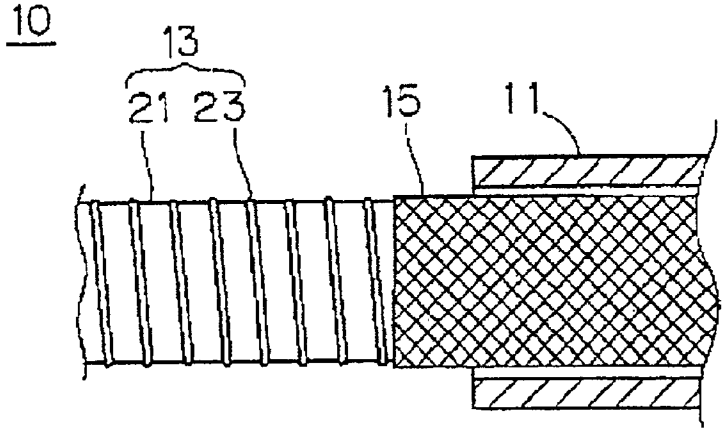
FIG. 1 is a partial sectional side view showing the layers of a pressure sensitive sensor of one embodiment of the present invention.
Figure 2:
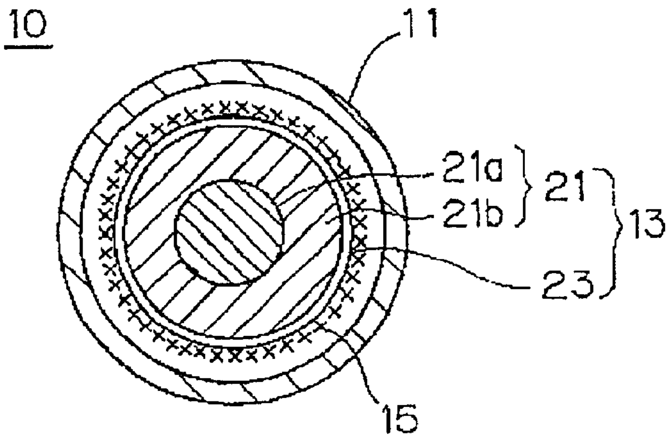
FIG. 2 is a cross-sectional view of the pressure sensitive sensor of the embodiment of FIG. 1.

FIG. 1 is a partial sectional side view of a pressure sensitive sensor of one embodiment of the present invention, and FIG. 2 is a cross-sectional view of the pressure sensitive sensor of the embodiment of FIG. 1. As shown in FIGS. 1 and 2, the pressure sensitive sensor 10 is provided with an elastic electroconductive tube 11 (the first electrode member), a central electrode member 13 (the second electrode member), and an insulative member 15. The insulative member 15 may be constructed of a suitable material and in a suitable form, such as, for example, an insulative material net braid member. Further, any suitable materials that can withstand a temperature range of −40° C. to 80° C. may be used as the materials for the pressure sensitive sensor 10.

The elastic electroconductive tube 11 is a tube member formed of an elastic electroconductive material such as, for example, a conductor powder (such as carbon powder or the like) mixed with an elastic material such as, for example, silicone rubber, EPDM or the like. The elastic electroconductive tube 11 has a cross-section in the form of a ring.

The central electrode member 13 has a long narrow shape that can be bent and is long and narrow along one direction. The central electrode member 13 is provided in the elastic electroconductive tube 11. The central electrode member 13 has properties such that it can recover its shape against a certain tensile force and bending deformation. The central electrode member 13 may include a conductor core member and may be constructed of any suitable material, such as, for example, nickel alloy, copper, copper alloy, nickel chrome or the like.

Figure 3:
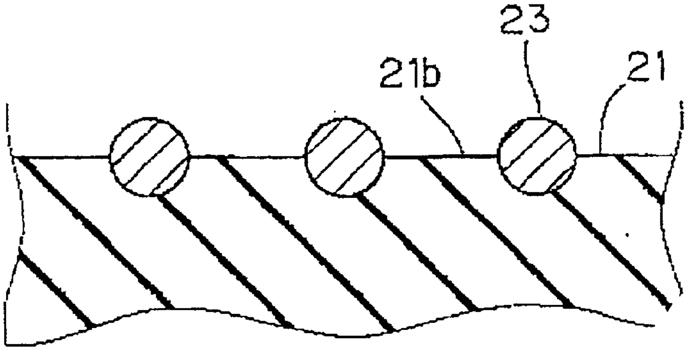
FIG. 3 is an enlarged sectional cutaway side view of a central electrode member according to the embodiment of FIG. 1.

Alternatively, and in the present embodiment, the central electrode member 13 may be provided with a central member 21 having an elastic outer peripheral surface, a cross-section in the shape of a ring and a long narrow form that can be easily bent and deformed, and an electroconductive metal wire 23 with a narrow diameter that is densely and horizontally wound in a coil with a fixed pitch on the outer peripheral surface of the central member 21. The electroconductive metal wire 23 may be constructed of any suitable material, such as, for example, nickel alloy, copper, copper alloy, nickel-chrome or the like. As shown in FIG. 3, in order to prevent movement of the metal wire 23, a portion of the section of the metal wire 23 is wound tightly and sinks into the surface of the central member 21. The metal wire 23 may sink into the central member 21 any suitable amount and in the present embodiment, sinks an amount approximately half of its diameter into the surface of the central electrode member 21.

As shown in FIG. 2, the central member 21 is provided with a central reinforcing member (tension member) 21*a* which has high tensile strength, and an elastic layer, such as an elastic insulating layer 21*b* which includes an elastic material such as, for example, an elastic insulating material provided around the central reinforcing member 21*a*. The elastic layer 21*a* may be provided by any known process, and in the present embodiment is provided by extrusion molding. The central reinforcing member 21*a* may include a material obtained by twisting or bundling a fiber with high tensile strength. The fiber may be any suitable fiber such as, for example, aramid fiber or the like. The elastic insulating material of the elastic insulating layer 21*b* may be formed of any suitable material such as, for example, a fluorine rubber, a silicone rubber, EPM or the like.

In one embodiment of the present invention, the pressure sensitive sensor 10 may be assembled by inserting the central electrode member 13, together with the insulative member 15, in the elastic electroconductive tube 11 in a condition in which the insulative member 15 is mounted on the central electrode member 13. Alternatively and as described later as a modified example and further embodiment, the elastic electroconductive tube 11 may be formed by extrusion molding the elastic electroconductive material on the central electrode member 13 on the outside of the insulative member 15.

Figure 4:
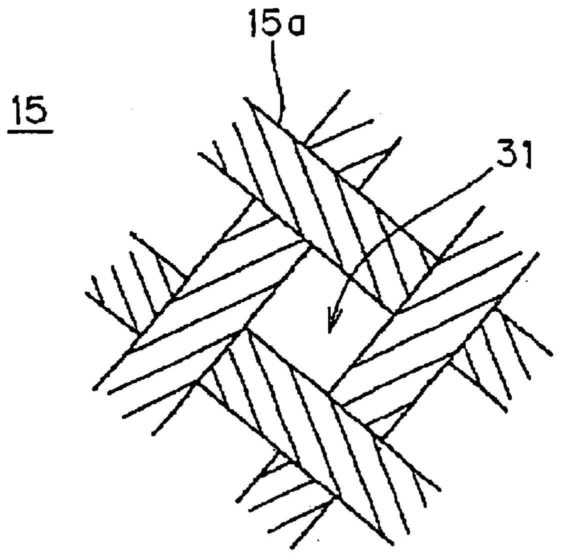
FIG. 4 is an enlarged cutaway view of a net braid member according to the embodiment of FIG. 1.

As shown in FIG. 4, the insulative member 15 may be a net braid member. The net braid member may be formed by knitting a plurality of yarn materials or strands 15*a* formed of an insulating fiber. The insulating fiber may be constructed of any suitable material such as, for example, aramid fiber, nylon fiber, or the like. As shown in FIGS. 1 and 2, the insulative member 15 is provided between the central electrode member 13 and the inner peripheral surface of the elastic electroconductive tube 11, covering the outer peripheral surface of the central electrode member 13. The material of the yarn strands 15*a* may be an aramid fiber used for its superior mechanical strength and resistance against compression in the thickness or radial direction of the net braid member. However, the yarn material 15*a* may be constructed of any suitable fiber materials such as, for example, a nylon fiber, a glass fiber, or the like. Further, the yarn materials 15*a* may be formed of an insulating wire material such as, for example, rubber thread or the like.

The yarn materials or strands 15*a* of the net braid member are coated or bonded to prevent unraveling during use, by coating a material such as, for example, a resin or a rubber, on its surface, or by being impregnated with a material such as, for example, a resin or rubber. The formation of the net braid member is performed by continuously knitting the coated yarn strands 15*a* in a cylindrical form on the central electrode member 13. It is preferred to knit or weave the yarn materials 15*a* so that the net braid member encloses the central electrode member 13 in order to prevent unraveling of the net braid member.

As shown in FIGS. 1 and 2, the insulative member 15 is designed and positioned to separate the central electrode member 13 (in particular, the metal wire 23 shown or, alternatively, a conductive core member, not shown) from the elastic electroconductive tube 11 to electrically insulate them from each other under a condition in which the pressure sensitive sensor 10 is not pressured.

On the other hand, when pressure is applied to the pressure sensitive sensor 10, the inner cavity of the elastic electroconductive tube 11 is elastically deformed, and may be crushed, and the elastic electroconductive tube 11 pushes on the central electrode member 13 by a fixed strength through the insulative member 15, and the insulative member 15 is designed to allow electrical contact between the elastic electroconductive tube 11 and the central electrode member 13 through the gap portions 31 (refer to FIG. 4) of the mesh in the embodiment wherein the insulative member 15 is a net braid member. The pressure sensitive sensor 10 is configured to detect whether pressure is provided or not, by detecting the presence or absence of the electrical conduction of the elastic electroconductive tube 11 with the central electrode member 13. Further, the elastic electroconductive tube 11 is restored to its original form (shown in FIG. 2) in accordance with the removal of pressure, and the electrical contact of the elastic electroconductive tube 11 with the electrode member 13 is eliminated.

A lead wire (not shown) for emitting signals is connected with one side end portion of the elastic electroconductive tube 11 and the central electrode member 13.

Examples of uses of the pressure sensitive sensor 10 which is thus constructed are considered below. First, the pressure sensitive sensor 10 of the present invention may be used for the detection of foreign objects, such as articles or a person's arm or leg, for example, caught between a door opening and a door, for preventing the sandwiching or squeezing of such a foreign object between a door opening and a door. Specifically, the pressure sensitive sensor 10 may be provided on the door or window of a vehicle, the door or window of a building, the entrance of an elevator, or at an opening and closing location of other opening and closing members, and used for preventing sandwiching or squeezing of a foreign object by detecting pressure from the foreign object at the opening and closing location. For example, the sensor 10 may be provided on an automatic door, such as in an automatic sliding door on a van, such that when the sensor 10 detects a predetermined pressure from a foreign object between the door and the door opening, the door is automatically opened to release the foreign object.

As a second use, the pressure sensitive sensor 10 may be used for the detection of the presence of a person or animal or the like. Specifically, the pressure sensitive sensor 10 may be provided to detect the presence or absence of a sitting body by applying the sensor to seats such as, for example, a chair (such as, for example, the seat of a vehicle or the like) when it is required to recognize the presence of a sitting body. For example, the pressure sensitive sensor 10 may be used in a vehicle to detect the presence of a person in a seat. When a predetermined pressure is detected in a seat, a fasten seat belt lamp will illuminate in the vehicle. The pressure sensitive sensor 10 may be used on any known type of seat such as, for example, a bench or the like, or may be used to detect the presence or absence of an invader by applying to a surface such as, for example, a mat or the like placed at the entrance or exit of a building. The pressure sensitive sensor 10 may be used to detect the presence or absence of an invader by applying to the upper rim portion of a fence and detecting pressure caused by an invader who goes over the fence, and further to detect the presence of a person by applying to a location where a change in weight occurs by the presence or absence of a person or animal, or other body.

As described above, according to the present invention, since the sensor is constructed such that the insulative member 15 is interposed between the elastic electroconductive tube 11 and the central electrode member 13, the structure is simple, and it can be produced easily and at low cost.

Further, even if pressure is applied to any location along the outer peripheral portion of the elastic electroconductive tube 11, pressure can be reliably detected. The pressure sensitive sensor 10 is equally sensitive all along its periphery in the longitudinal and radial directions.

Further, since the sensor is constructed such that the insulative member 15 is interposed between the elastic electroconductive tube 11 and the central electrode member 13, the dimension of the gap between the elastic electroconductive tube 11 and the central electrode member 13 can be reduced to a level of the thickness of the insulative member 15, according to requirements of the particular use, and is suitable for making the sensor 10 small in size. Further, since the sensor is constructed such that the insulative member 15 is interposed between the elastic electroconductive tube 11 and the central electrode member 13, the elastic electroconductive tube 11 will not be erroneously brought in contact with the central electrode member 13 to cause an error detection, even if the pressure sensitive sensor 10 is bent or kinked at a sharp curvature, and the sensor wire will function appropriately.

Further, when the pressure is eliminated, the insulative member 15 is restored to its original shape and thickness according to the elastic properties in the direction of thickness of the insulative member 15, from a condition in which the insulative member is highly compressed to a thin shape between the electrodes at the pressure location. Therefore, erroneous electrical contact of the elastic electroconductive tube 11 with the central electrode member 13 can be positively and reliably prevented.

Further, since the restoring elastic force of the insulative member 15 is minimally damaged or undamaged from repeated compression in the thickness direction, the sensor 10 has excellent durability and reliability.

Further, since a resin or a rubber is coated on the surface of the yarn strands, or materials 15*a* which form the knitted net braid member embodiment of the insulative member 15, or the yarn materials 15 are coated by being impregnated with a resin or rubber, any unbinding or unraveling of the yarn materials 15*a* over time, or due to the lapse of years or to use, that can cause the net braid density (knitting density) of the mesh of the net braid member to become unequal and cause unequal sensitivity along the sensor periphery so that some locations are unable to detect pressure, is prevented and the reliability of the pressure sensitive sensor 10 can be improved.

Further, since the external electrode includes the elastic electroconductive tube 11, and the central electrode member 13 has a long narrow shape which can be bent in one direction and is provided with the elastic electroconductive tube inside, pressure can be positively detected even if the pressure is provided to the elastic electroconductive tube 11 from any direction and in any location on the periphery along the longitudinal or radial direction.

The pressure sensitive sensor 10 can be easily provided in various arrangements in which it may be bent and deformed. Further, the pressure sensitive sensor 10 can be easily provided in a narrow space by making the cross-sectional size of the sensor 10 small.

Further, the pressure sensitive sensor 10 is constructed such that the central electrode member 13 can be restored to its original shape from tensile forces and bending deformation, and is provided with the central member 21 having at least an elastic outer peripheral portion with a long narrow shape, the electroconductive metal wire 23 horizontally wound on the outer periphery of the central member 21 in a coil, and the insulative member 15 interposed between the elastic electroconductive tube 11 and the central electrode member 13. Therefore, the pressure sensitive sensor 10 has high mechanical strength, high restorative capability against bending and excellent impact resistance.

Figure 5:
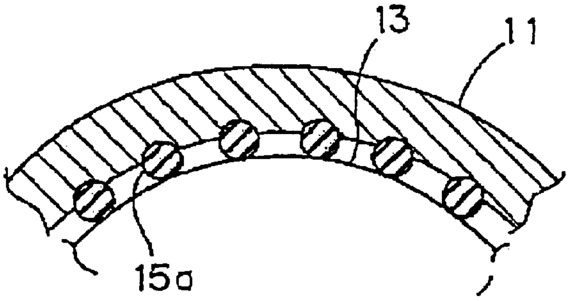
FIG. 5 is an enlarged cross-sectional cutaway view of an elastic electroconductive tube formed by extrusion molding according to the embodiment of FIG. 1.

In the pressure sensitive sensor of the second embodiment of the present invention shown in FIG. 5, the elastic electroconductive tube 11 is formed by extrusion molding the elastic electroconductive material on the central electrode member 13 on the outside of the insulative member 15. As shown in FIG. 5, it is preferable to simultaneously extrude the elastic electroconductive tube and coat the yarn materials 15*a* so that the yarn materials 15*a* of the net braid member sink into and are embedded in the inner peripheral surface of the elastic electroconductive tube 11. Thus, in the second embodiment, the production steps of the pressure sensitive sensor 10 can be more simplified. Therefore, the additional effect of lowering the cost of making the pressure sensitive sensor 10 is obtained.

Figure 6:
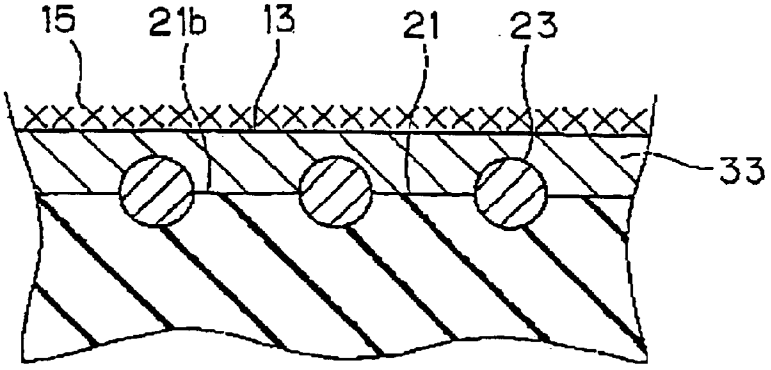
FIG. 6 is an enlarged sectional cutaway view of a central electrode member including a coating layer on the coiled metal wire according to a second embodiment of the present invention.

In the pressure sensitive sensor of the third embodiment of the present invention shown in FIG. 6, the electroconductive coating layer 33 which includes an electroconductive resin or an electroconductive rubber may be additionally provided so that the outer peripheral surface of the central member 21 is covered on the outside of the horizontally coiled metal wire 23, in the construction of the central electrode member 13. In this case, the insulative member 15 is provided on the electroconductive coating layer 33. Thus, the contact area and the frictional force (a force against positional deviation of the metal wire 23) of the insulative member 15 with the central electrode member 13 can be increased in comparison with a case of directly covering the insulative member 15 over the horizontally coiled metal wire 23, and any positional deviation of the insulative member 15 (particularly, the yarn materials 15*a* which constitute the net braid member) on the central electrode member 13 can be prevented. As a result, the knitting density of the net braid member can be more constantly retained.

As another modified example, the central electrode member 13 may be provided by twisting or bundling a plurality of single metal wires, or may be provided by a single metal wire.

Figure 7:
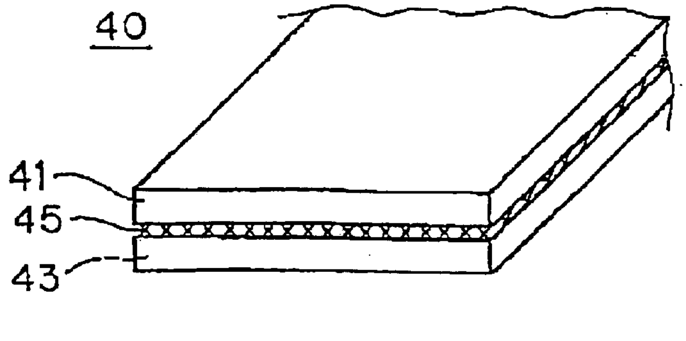
FIG. 7 is a perspective view of a pressure sensitive sensor according to a third embodiment of the present invention.
Figure 8:
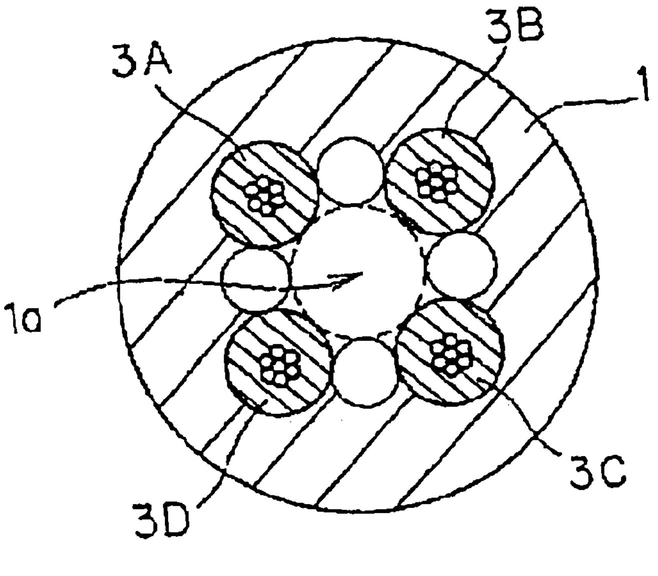
Fig.8 PRIOR ART
FIG. 8 is a cross-sectional view of a conventional pressure sensitive sensor.

FIG. 7 is a perspective view of the pressure sensitive sensor of the third embodiment of the present invention. As shown in FIG. 7, the pressure sensitive sensor 40 is provided with first and second plate (such as, for example, a flat plate) electrode members 41 and 43 which are arranged oppositely and spaced from each other, and an insulative member 45 is interposed between the electrode members 41 and 43. The insulative member 45 may be constructed of any suitable material and be in any form such as a net braid member.

Both of the electrode members 41 and 43 are formed by an elastic electroconductive material, such as the material of the elastic electroconductive tube 11. The insulative member 45 may be formed by knitting or weaving a plurality of the yarn materials 15*a*, similar to the above-described net braid member.

Further, the pressure sensitive sensor 40 of this embodiment is also designed to detect pressure when both of the electrode members 41 and 43 are mutually brought in electrical contact to conduct electricity through the gap portions of mesh of the net braid member in the embodiment wherein the insulative member 15 is a net braid member, in like manner as the case of the first embodiment of the present invention. The pressure sensitive sensor 40 of the third embodiment of the present invention can also obtain the similar specific effect as the first and second embodiments by using the net braid member.

According to the present invention, since the pressure sensitive sensor has a construction in which the insulative member is interposed between the first and second electrode members, the structure is simple, and the structure can be produced easily and at low cost.

Further, even if pressure is applied to any spot where both of the electrode members face each other, the pressure can be correctly detected with a constant degree of sensitivity along its longitudinal and radial directions, and is highly reliable.

Further, since the sensor has a construction in which the insulative member is interposed between the first and second members, the gap dimension between the first and second electrode members can be reduced to the level of the thickness of the insulative member, according to requirements of a specific application, and it is possible to make the sensor 10 small in size.

Further, since the insulative member is interposed between the first and second electrode members, the electrode members are not brought erroneously into contact to cause a false detection of pressure even if the pressure sensitive sensor is bent or kinked at a sharp curvature, and the sensor will function correctly. Further, when the pressure is eliminated, the insulative member is restored to its original thickness according to the elastic force in the thickness direction of the insulative member, from a condition in which it was highly compressed between both of the electrodes. Therefore, erroneous electrical contact of the electrode members when no pressure is applied can be positively prevented, and the reliability of the sensor is also high.

Further, since the elastic force of the insulative member is not damaged or is minimally damaged by the repeated compression in the thickness direction, it has excellent durability and reliability.

Further, since a resin or a rubber is coated on the yarn materials which forms the net braid member by being knitted or weaved, or the yarn materials are impregnated with a resin or rubber, unraveling or unbinding of the yarn materials over time or due to use, unequal net braid density (knitting density) of the mesh of the net braid member, unequal sensitivity and locations spots along the sensor that provide no detection can be prevented, and the reliability of the pressure sensitive sensor can be improved.

Further, the first electrode member is an elastic electroconductive tube which includes an elastic electroconductive material, and the second electrode member has a narrow long form which can be bent, and a central electrode member provided in the elastic electroconductive tube. Therefore, pressure can be positively detected even if the pressure is applied to the elastic electroconductive tube from any direction in a longitudinal or radial direction.

Further, the pressure sensitive sensor can be easily provided in various arrangements in a condition in which it is bent and deformed. Further, the pressure sensitive sensor can be easily arranged in a narrow space by easily making the cross-sectional size of the sensor small.

According to the present invention, the central electrode member can recover its shape from a tensile and bending deformation and is provided with the central member at least whose outer peripheral portion is elastic and which has a long narrow shape, and the electroconductive metal wire horizontally wound on the outer peripheral surface of the central member in a coil form, and the insulative member is interposed between the elastic electroconductive tube and the central electrode member. Therefore, a pressure sensitive sensor having high mechanical strength, high recovery properties against bending and excellent impact resistance can be provided.

According to the present invention, since the electroconductive coating layer which includes an electroconductive resin or an electroconductive rubber is provided at the central electrode member so that the outer peripheral surface of the central member is covered on the outside of the metal wire, the contact area and the frictional force (a hooking force against a positional deviation) of the insulative member with the central electrode member can be increased in comparison with a case of directly covering the insulative member over the horizontally coiled metal wire, and the positional deviation of the insulative member (particularly, the yarn materials which constitutes the net braid member in the embodiments including a net braid member) on the central electrode member can be prevented. As a result, the knitting density of the net braid member can be more constantly retained.

According to the present invention, since the elastic electroconductive tube is formed by extrusion molding the elastic electroconductive material on the central electrode member on the outside of the insulative member, the production steps of the pressure sensitive sensor can be simplified, and it can be designed to make the cost of the pressure sensitive sensor lower.

Although the invention has been described with reference to an exemplary embodiment, it is understood that the words that have been used are words of description and illustration, rather than words of limitation. Changes may be made, within the purview of the appended claims, as presently stated and as amended, without departing from the scope and spirit of the present invention in its aspects. Although the invention has been described herein with reference to particular means, materials and embodiments, the invention is not intended to be limited to the particulars disclosed herein. Instead, the invention extends to all functionally equivalent structures, methods and uses, such as are within the scope of the appended claims.

The present disclosure relates to subject matter contained in priority Japanese Application No. JP 2000-397945, filed on Dec. 27, 2000, the disclosure of which is herein expressly incorporated by reference in its entirety.

What is claimed is:

1. A pressure sensitive sensor for detecting pressure by electrical conduction caused by pressing into contact with each other a first electrode member and a second electrode member provided in a spaced arrangement in an unpressed state, said pressure sensitive sensor comprising:

an insulative member provided between said first electrode member and said second electrode member, said insulative member including an insulating material that allows electrical contact between said first electrode member and said second electrode member through a gap portion in its mesh when pressed, and insulates said first electrode member and said second electrode member when not pressed;

wherein said first electrode member includes a first plate comprising an elastic electroconductive material, said second electrode member includes a second plate comprising an elastic electroconductive material, and said insulative member is provided between said first plate and said second plate.

2. A method of making a pressure sensitive sensor for detecting pressure by electrical conduction caused by pressing into contact with each other a first electrode member and a second electrode member provided in a spaced arrangement in an unpressed state, said method comprising:

providing an insulative member between said first electrode member and said second electrode member, said insulative member including an insulating material that allows electrical contact between said first electrode member and said second electrode member when pressed, and insulates said first electrode member and said second electrode member when not pressed;

providing a first electrode member including an elastic electroconductive tube, providing a second electrode member including a central electrode member having a long narrow bendable shape provided inside said elastic electroconductive tube, and providing said insulative member between said central electrode member and said elastic electroconductive tube so that said insulative member covers an outer peripheral surface of said central electrode member.

3. A method of making a pressure sensitive sensor for detecting pressure by electrical conduction caused by pressing into contact with each other a first electrode member and a second electrode member provided in a spaced arrangement in an unpressed state, said method comprising:

providing an insulative member between said first electrode member and said second electrode member, said insulative member including an insulating material that allows electrical contact between said first electrode member and said second electrode member when pressed, and insulates said first electrode member and said second electrode member when in said unpressed state;

wherein said insulative member includes a net braid member provided between said first electrode member and said second electrode member, said net braid member allowing electrical contact between said first electrode member and said second electrode member through a gap portion in its mesh when pressed, and insulating said first electrode member and said second electrode when not pressed, said method further comprising:

forming said net braid member by knitting a plurality of yarn strands.

4. A method of making a pressure sensitive sensor for detecting pressure by electrical conduction caused by pressing into contact with each other a first electrode member and a second electrode member provided in a spaced arrangement in an unpressed state, said method comprising:

providing an insulative member between said first electrode member and said second electrode member, said insulative member including an insulating material that allows electrical contact between said first electrode member and said second electrode member when pressed, and insulates said first electrode member and said second electrode member when in said unpressed state;

providing a first electrode member including an elastic electroconductive tube, providing a second electrode member including a central electrode member having a long narrow bendable shape provided inside said elastic electroconductive tube, and providing said insulative member between said central electrode member and said elastic electroconductive tube so that said insulative member covers an outer peripheral surface of said central electrode member.

5. A pressure sensitive sensor for detecting pressure by electrical conduction caused by pressing into contact with each other a first electrode member and a second electrode member provided in a spaced arrangement in an unpressed state, said pressure sensitive sensor comprising:

an insulative member provided between said first electrode member and said second electrode member, said insulative member including an insulating material that allows electrical contact between said first electrode member and said second electrode member through a gap portion in its mesh when pressed, and insulates said first electrode member and said second electrode member when not pressed;

wherein said insulative member includes a net braid member provided between said first electrode member and said second electrode member, said net braid member allowing electrical contact between said first electrode member and said second electrode member through a gap portion in its mesh when pressed, and insulating said first electrode member and said second electrode when not pressed;

wherein said net braid member is formed by knitting a plurality of yarn strands; and wherein said yarn strands each include an insulating fiber coated on its surface with an insulating resin or rubber.

6. A pressure sensitive sensor for detecting pressure by electrical conduction caused by pressing into contact with each other a first electrode member and a second electrode member provided in a spaced arrangement in an unpressed state, said pressure sensitive sensor comprising:

an insulative member provided between said first electrode member and said second electrode member, said insulative member including an insulating material that allows electrical contact between said first electrode member and said second electrode member through a gap portion in its mesh when pressed, and insulates said first electrode member and said second electrode member when in said unpressed state;

wherein said insulative member includes a net braid member provided between said first electrode member and said second electrode member, said net braid member allowing electrical contact between said first electrode member and said second electrode member through a gap portion in its mesh when pressed, and insulating said first electrode member and said second electrode when not pressed; and wherein said net braid member is formed by knitting a plurality of yarn strands.

7. The pressure sensitive sensor according to claim 6, wherein said yarn strands each include an insulating fiber coated on its surface with an insulating resin or rubber.

8. The pressure sensitive sensor according to claim 6, wherein said yarn strands each include an insulating fiber impregnated with an insulating resin or rubber.

9. A pressure sensitive sensor for detecting pressure by electrical conduction caused by pressing into contact with each other a first electrode member and a second electrode member provided in a spaced arrangement in an unpressed state, said pressure sensitive sensor comprising:

an insulative member provided between said first electrode member and said second electrode member, said insulative member including an insulating material that allows electrical contact between said first electrode member and said second electrode member through a gap portion in its mesh when pressed, and insulates said first electrode member and said second electrode member when in said unpressed state; and wherein said first electrode member includes a first plate comprising an elastic electroconductive material, said second electrode member includes a second plate comprising an elastic electroconductive material, and said insulative member is provided between said first plate and said second plate.

10. The pressure sensitive sensor according to claim 9, wherein said first and second electrode members are restorable to their shapes from tensile and bending deformation.

11. The pressure sensitive sensor according to claim 9, wherein said insulative member includes a net braid member provided between said first electrode member and said second electrode member, said net braid member allowing electrical contact between said first electrode member and said second electrode member through a gap portion in its mesh when pressed, and insulating said first electrode member and said second electrode when not pressed.

12. A pressure sensitive sensor for detecting pressure by electrical conduction caused by pressing into contact with each other a first electrode member and a second electrode member provided in a spaced arrangement in an unpressed state, said pressure sensitive sensor comprising:

an insulative member provided between said first electrode member and said second electrode member, said insulative member including an insulating material that allows electrical contact between said first electrode member and said second electrode member through a gap portion in its mesh when pressed, and insulates said first electrode member and said second electrode member when in said unpressed state;

wherein said insulative member includes a net braid member provided between said first electrode member and said second electrode member, said net braid member allowing electrical contact between said first electrode member and said second electrode member through a gap portion in its mesh when pressed, and insulating said first electrode member and said second electrode when not pressed; and wherein said first electrode member includes an elastic electroconductive tube comprising an elastic electroconductive material, said second electrode member includes a central electrode member having a long narrow bendable shape provided inside said elastic electroconductive tube, and said insulative member is provided between said central electrode member and said elastic electroconductive tube so that said net braid member covers an outer peripheral surface of said central electrode member.

13. The pressure sensitive sensor according to claim 12, wherein said elastic electroconductive tube is formed by extrusion molding said elastic electroconductive material on an outer peripheral surface of said central electrode member and covering said insulative member.

14. The pressure sensitive sensor according to claim 12, wherein said central electrode member is constructed by one of twisting and bundling a plurality of single metal wires.

15. The pressure sensitive sensor according to claim 12, wherein said central electrode member comprises a single metal wire.

16. The pressure sensitive sensor according to claim 12, wherein said central electrode member is restorable to its shape from tensile and bending deformation, said central electrode member being provided with a central member having a long narrow shape and having at least an outer elastic peripheral portion and an electroconductive metal wire wound on the outer periphery of said central member in a coil.

17. The pressure sensitive sensor according to claim 16, wherein said central electrode member is provided with an electroconductive coating layer including one of an electroconductive resin and an electroconductive rubber provided on the inside of said insulative member so that an outer peripheral surface of said central member is covered underneath said metal wire.

18. The pressure sensitive sensor according to claim 16, wherein said electroconductive metal wire wound on said outer periphery of said central member in a coil is wound tightly around said central member and is embedded into said outer periphery of said central member.

19. The pressure sensitive sensor according to claim 18, wherein said electroconductive metal wire is embedded in said outer periphery of said central member to substantially half the diameter of said electroconductive metal wire.

* * * * *